US008858166B2

(12) United States Patent
Zheng et al.

(10) Patent No.: US 8,858,166 B2
(45) Date of Patent: Oct. 14, 2014

(54) ROTARY MACHINE SEAL ASSEMBLY WITH BUTT GAP SEAL ELEMENTS

(75) Inventors: Xiaoqing Zheng, Niskayuna, NY (US); Bernard Arthur Couture, Jr., Guilderland, NY (US); Mehmet Demiroglu, Troy, NY (US); Gregory Leonard Diantonio, Wappingers Falls, NY (US); Daniel Edward Jordy, Glenville, NY (US)

(73) Assignee: General Electric Company, Schenectady, NY (US)

( * ) Notice: Subject to any disclaimer, the term of this patent is extended or adjusted under 35 U.S.C. 154(b) by 584 days.

(21) Appl. No.: 13/227,218

(22) Filed: Sep. 7, 2011

(65) Prior Publication Data

US 2013/0058765 A1 Mar. 7, 2013

(51) Int. Cl.
*F01D 11/00* (2006.01)
*F16J 15/00* (2006.01)
*F16J 15/44* (2006.01)
*F01D 11/02* (2006.01)

(52) U.S. Cl.
CPC ............. *F16J 15/442* (2013.01); *F01D 11/001* (2013.01); *F01D 11/003* (2013.01); *F01D 11/025* (2013.01)
USPC ...................... 415/168.1; 415/168.2; 415/230; 277/416

(58) Field of Classification Search
CPC ............ F05D 2240/58; F05D 2240/55; F05D 2240/581; F16J 15/00; F16J 15/447
USPC ......... 277/416, 422, 493, 543, 546, 547, 631; 415/168.1, 168.2, 170.1, 173.6, 173.7, 415/174.1, 174.2, 174.5, 230
See application file for complete search history.

(56) References Cited

U.S. PATENT DOCUMENTS 5,026,075 A * 6/1991 Massarani ...................... 277/419
5,201,530 A 4/1993 Kelch et al.
(Continued)

FOREIGN PATENT DOCUMENTS

EP 1790883 A1 5/2007
FR 2966504 A1 4/2012
GB 2480680 A 11/2011

OTHER PUBLICATIONS

Search Report and Written Opinion from FR Application No. 1257396 dated Jul. 10, 2013.
(Continued)

*Primary Examiner* — Edward Look
*Assistant Examiner* — Christopher R Legendre
(74) *Attorney, Agent, or Firm* — Ernest G. Cusick; Hoffman Warnick LLC

(57) ABSTRACT

Systems and devices for substantially fluidly isolating portions of a rotary machine are disclosed. In one embodiment, a seal assembly for a rotary machine includes: a complementary set of seal segments configured relative one another so as to form a substantially continuous body with butt gaps between the seal segments, the segments including: a head flange; and an axial neck connected to the head flange, wherein the axial neck extends radially inboard and includes an axial slot formed substantially there through; and at least one butt gap seal element, wherein the at least one butt gap seal element includes an axial flange and a radial flange, the axial flange disposed within the axial slots of adjacent seal segments; and the radial flange extending radially inboard from the axial slots to a proximity of the rotary machine substantially forming a barrier to axial flow through the butt gap.

20 Claims, 11 Drawing Sheets

(56) References Cited

U.S. PATENT DOCUMENTS

| | | | |
|---|---|---|---|
| 6,331,006 B1 * | 12/2001 | Baily et al. | 277/355 |
| 7,631,879 B2 | 12/2009 | Diantonio | |
| 8,132,815 B1 * | 3/2012 | Dillon | 277/355 |
| 8,348,280 B2 * | 1/2013 | Pandey et al. | 277/416 |
| 8,459,653 B2 * | 6/2013 | Zheng | 277/355 |
| 2002/0190474 A1 * | 12/2002 | Turnquist et al. | 277/355 |
| 2006/0151958 A1 | 7/2006 | Chevrette et al. | |
| 2008/0296847 A1 | 12/2008 | Chevrette et al. | |
| 2009/0051117 A1 | 2/2009 | Crudgington | |
| 2012/0098211 A1 | 4/2012 | Pandey et al. | |
| 2013/0058765 A1 * | 3/2013 | Zheng et al. | 415/173.1 |

OTHER PUBLICATIONS

Flores, Office Action Communication for U.S. Appl. No. 13/197,532 dated Mar. 28, 2014, 16 pages.

* cited by examiner

ROTARY MACHINE SEAL ASSEMBLY WITH BUTT GAP SEAL ELEMENTS

BACKGROUND OF THE INVENTION

The subject matter disclosed herein relates to seal assemblies and, more particularly, to devices for sealing butt gaps between segments of a seal assembly in a rotary machine.

The design and operation of some rotary machines (e.g. steam turbines, gas turbines, etc.) include the use of segmented seal assemblies. These seal assemblies may include a number of segments which are assembled together to form a substantially continuous body (e.g., a body which is largely but not wholly uniform in a surface and/or shape), the segments forming a circle with small gaps between a distal end of each segment. The segments are disposed against one another so as to form a seal or barrier. During operation, these segmented seal assemblies substantially fluidly isolate/separate portions of the turbine. However, some spacing/clearances may be required between the segments of these segmented seal assemblies to allow for variances in thermal expansion rates and steam turbine operating temperatures. This limitation on clearance tightness may require spaces/breaks (e.g. butt gaps) between the circumferential ends of adjacent segments of the seal assembly, and thereby enable fluid leakage through the seal assembly. Fluid leakage through the seal assembly may damage turbine components and/or decrease the efficiency of the steam turbine. Some steam turbines may limit leakage through these thermal spaces by placing a sealing strip in contact with an outside diameter surface of the segment head flange. However, this strip may fail to prevent radial leakage through the axial gaps between the side of the head flange and the side surface of the housing. Further, leakage may pass around the distal ends of the strip and through the butt gap perpendicular to the axial mating surface between the seal assembly and the housing.

BRIEF DESCRIPTION OF THE INVENTION

Systems and devices for substantially fluidly isolating portions of a rotary machine are disclosed. In one embodiment, a seal assembly for a rotary machine includes: a complementary set of seal segments configured relative one another so as to form a substantially continuous body with butt gaps between the seal segments, the seal segments including: a head flange; and an axial neck connected to the head flange, wherein the axial neck extends radially inboard and includes an axial slot formed substantially there through; and at least one butt gap seal element, wherein the at least one butt gap seal element includes an axial flange and a radial flange, the axial flange disposed within the axial slots of adjacent seal segments; and the radial flange extending radially inboard from the axial slots to a proximity of the radial mating surface of the seal substantially forming a barrier to axial flow through the butt gap.

A first aspect of the disclosure provides a seal assembly for a rotary machine including: a complementary set of seal segments configured relative one another so as to form a substantially continuous body with butt gaps between the seal segments, the segments including: a head flange; and an axial neck connected to the head flange, wherein the axial neck extends radially inboard and includes an axial slot formed substantially there through; and at least one butt gap seal element, wherein the at least one butt gap seal element includes an axial flange and a radial flange, the axial flange disposed within the axial slots of adjacent seal segments; and the radial flange extending radially inboard from the axial slots to a proximity of radial mating surface of the seal substantially forming a barrier to axial flow through the butt gap.

A second aspect provides a turbine including: a rotor; a stator substantially enclosing the rotor; and a seal assembly disposed within the stator and configured to substantially fluidly isolate portions of the turbine, the seal assembly including: a complementary set of seal segments configured relative one another so as to form a substantially continuous body with butt gaps between seal segments, the seal segments including: a head flange; and an axial neck connected to the head flange, wherein the axial neck extends radially inboard and includes an axial slot formed substantially there through; and at least one butt gap seal element, wherein the at least one butt gap seal element includes an axial flange and a radial flange, the axial flange disposed within the axial slots of adjacent seal segments; and the radial flange extending radially inboard from the axial slots to a proximity of the radial mating surface of the seal substantially forming a barrier to axial flow through the butt gap.

A third aspect provides a power generation system including: a generator; and a turbine operably connected to the generator, the turbine including; a rotor; a stator substantially enclosing the rotor; and a seal assembly disposed within the stator and configured to substantially fluidly isolate portions of the turbine, the seal assembly including: a complementary set of seal segments configured relative one another so as to form a substantially continuous body with butt gaps between seal segments, the seal segments including: a head flange; and an axial neck connected to the head flange, wherein the axial neck extends radially inboard and includes an axial slot formed substantially there through; and at least one butt gap seal element, wherein the at least one butt gap seal element includes an axial flange and a radial flange, the axial flange disposed within the axial slots of adjacent seal segments; and the radial flange extending radially inboard from the axial slots to a proximity of the rotary machine substantially forming a barrier to axial flow through the butt gap.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
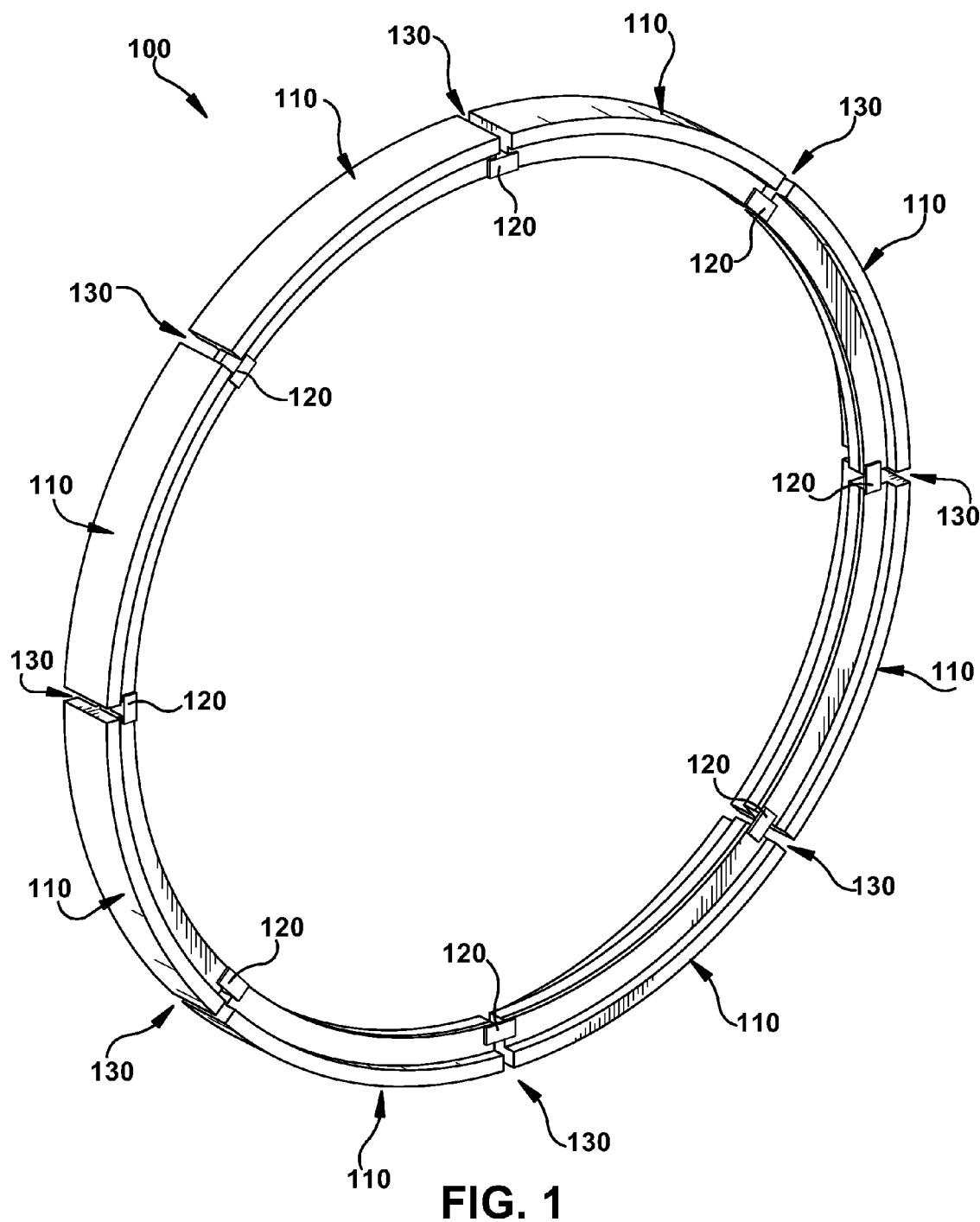
FIG. 1 shows a three-dimensional perspective view of a seal assembly system in accordance with an aspect of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, aspects of the invention provide for systems and devices configured to seal butt gaps between segments of a seal assembly in a rotary machine by disposing a butt gap seal element within the axial necks of a set of adjacent seal segments. The butt gap seal element substantially divides the butt gap between the seal segments into a head flange portion that is exposed to upstream/high-pressure, and an axial neck portion that is exposed to downstream/low-pressure, thereby enabling a seal which prevents a fluid from directly leaking through the butt gap in radial and axial directions. An axial flange of the butt gap seal element extends within a slot in the axial neck to a substantial proximity (e.g. either touching or within about 0.025 centimeters) of a steam joint. The steam joint being a location where the seal assembly and portions of the rotary machine contact one another, thereby forming a pressurized secondary seal that prevents radial leakage through the joint. A radial flange of the butt gap seal element extends to contact and/or complement an inner sealing surface (e.g. a complementary sealing portion of a rotor and/or stator), thereby acting as a barrier by creating a tortuous path between the portions of the rotary machine separated by the seal assembly.

In the art of power generation systems (including, e.g., nuclear reactors, steam turbines, gas turbines, etc.), seal assemblies are often included as part of the system, substantially fluidly isolating and defining sections of a rotary machine. Typically, a seal assembly includes multiple segments assembled together with tight clearances/butt gaps. These multiple segments, once assembled, forming a substantially continuous body which may limit fluid leakage between different sections of the rotary machine. However, varying temperatures and thermal expansion rates of the portions of these seal segments and their mating components, may result in binding and/or arching of the seal segments or system. This arching and/or binding may cause component damage or openings in the radial clearances of the seal assembly which result in significant leakage. As such, the butt gaps between these segments may need to include tolerances which are large enough to allow for differences in the thermal expansion rates of the various elements. These tolerances may enable leakage through the seal assembly, resulting in component damage and/or inefficient operation.

Turning to the figures, embodiments of a butt gap seal element for segments of a seal assembly are shown, where the butt gap seal element may increase efficiency of a rotary machine, a turbine, and/or an overall power generation system by reducing fluid leakage between segments of the seal assembly. Specifically, referring to FIG. 1, a three-dimensional schematic view of an embodiment of a seal assembly 100 is shown according to embodiments of the invention. Seal assembly 100 may include a plurality of seal segments 110 disposed relative one another so as to form a substantially continuous body (e.g., largely if not wholly a uniform body). It is understood that a substantially continuous body is one in which a plurality of elements are configured to form an assembly which would be recognized as a single unit, e.g., a component with a uniform surface or shape but for a set of clearances/gaps between elements. In one embodiment, the body has an annular or circular shape with clearances/gaps between seal segments 110, at the interface of abutting seal segments 110. In one embodiment, the substantially continuous body is an annulus or circular assembly of elements with small gaps/clearances between the elements. In one embodiment, seal segments 110 may be disposed such that a butt gap 130 (e.g., the gap that exists between an end of a seal segment 110 and an adjacent seal segment 110, and prevents seal assembly 100 from being continuous) is formed there between. In another embodiment, seal segments 110 may be physically connected to one another by a set of butt gap seal elements 120. In another embodiment, seal assembly 100 includes a plurality of butt gap seal elements 120 which may be disposed within each adjacent pair of seal segments 110. Connection, assembly and manner of assembly of seal segments 110 and butt gap seal elements 120 may be accomplished in any number of ways as discussed further below or known in the art.

Figure 2:
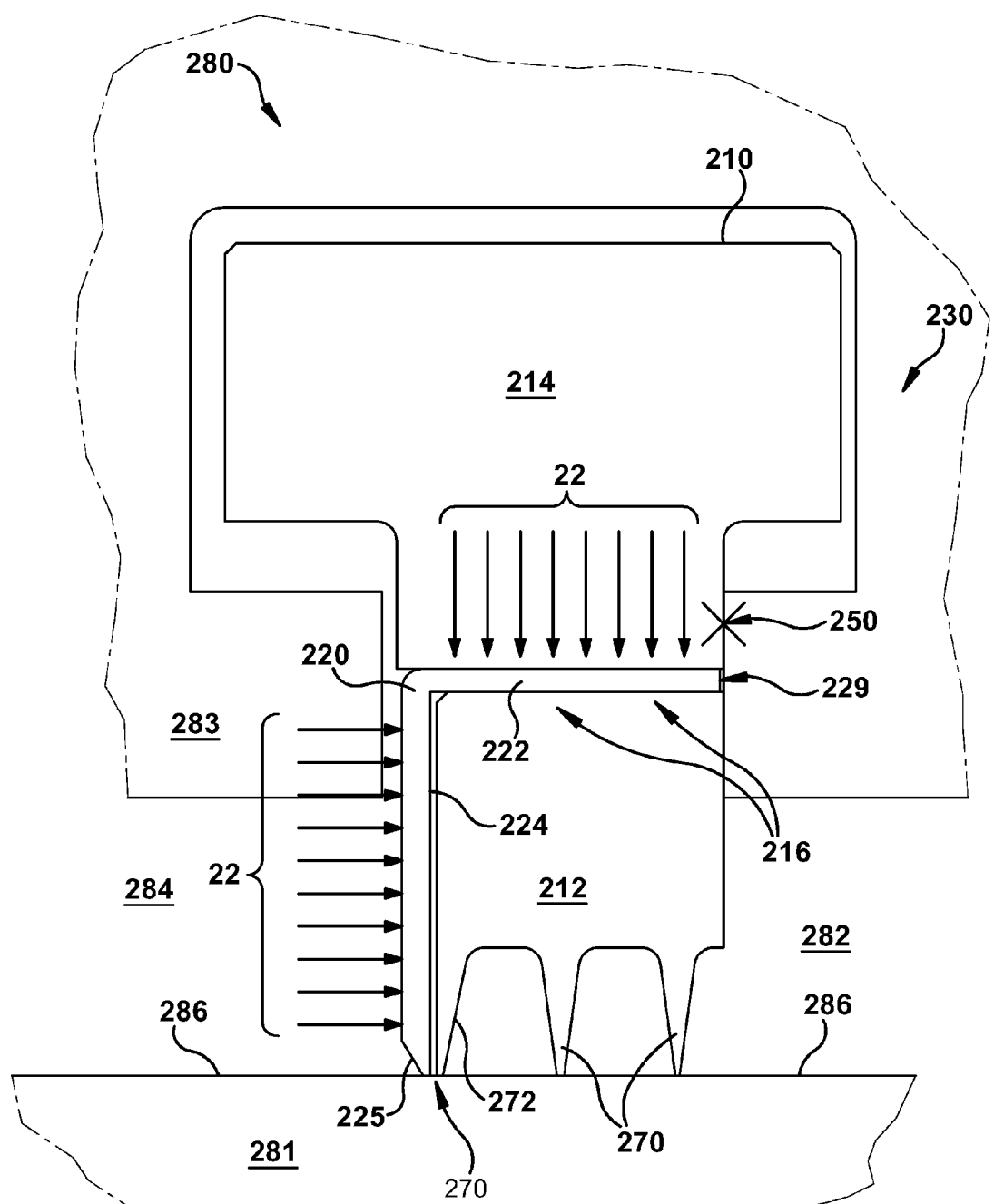
FIG. 2 shows a schematic cut-away view of portions of a seal segment in accordance with an aspect of the invention.

Turning to FIG. 2, a schematic cut-away view of a seal segment 210 is shown partially defining a butt gap 230 within a rotary machine 280 according to embodiments. It is understood that elements similarly numbered between FIG. 1 and FIG. 2 may be substantially similar as described with reference to FIG. 1. Further, in embodiments shown and described with reference to FIGS. 2-11, like numbering may represent like elements. Redundant explanation of these elements has been omitted for clarity. Finally, it is understood that the components of FIGS. 1-11 and their accompanying descriptions may be applied to any embodiment described herein.

Returning to FIG. 2, in this embodiment, rotary machine 280 includes a first component 281 and a second component 283. Seal segment 210 is positioned at an interface between first component 281 and second component 283 to minimize fluid flow/leakage between a first rotary machine cavity 282 and a second rotary machine cavity 284. Seal segment 210 includes a head flange 214, an axial neck 212 connected to head flange 214 and a set of seal teeth 270 connected to axial neck 212. Axial neck 212 extends radially inboard from head flange 214 to form a barrier with an inner seal surface 286 on first component 281. Seal teeth 270 and 272 are connected to an end of axial neck 212 in contact with and/or close proximity to inner seal surface 286 on first component 281 of rotary machine 280, serving as a barrier to fluid flow between first rotary machine cavity 282 and second rotary machine cavity 284. This contact and/or close proximity between inner seal surface 286 and seal teeth 270 and 272 creates a tortuous fluid path between rotary machine 280 and seal segment 210, thereby substantially forming a seal. It is understood that the terms substantial and substantially describe configurations or elements which are largely or wholly as described (e.g., greater than approximately 50% seal quality). Seal teeth 270 and 272 are configured to substantially fluidly separate first rotary machine cavity 282 and second rotary machine cavity 284 which are located opposite one another relative seal teeth 270 and 272. In this embodiment, seal segment 210 is further configured with an axial slot 216 to receive an axial flange 222 of a butt gap seal element 220. In one embodiment, axial slot 216 may be configured to allow butt gap seal element 220 to directly touch a steam joint 250. Steam joint 250 is the axial mating surface between seal segment 210 and second component 283. In one embodiment, seal segment 210 and second component 283 are machined with controlled flatness to increase mating surface contact between seal segment 210 and second component 283, thereby limiting leakage on the steam-joint surface. In one embodiment, a distal end 229 of mated axial flange 222 is biased about 0.025 centimeters short of contacting steam joint 250. In another embodiment, slot 216 may be configured substantially proximate steam joint 250, thereby locating distal end 229 of mated axial flange 222 proximate steam joint 250. In one embodiment, slot 216 is formed within axial neck 212.

In one embodiment, a radial flange 224 of butt gap seal element 220 may extend toward inner seal surface 286 reducing the gap between a tip 225 of butt gap seal element 220 and inner seal surface 286, thereby overlapping with seal tooth 272 to form a substantially circumferential continuous fluid barrier and prevent upstream fluid from reaching axial neck 212. Radial flange 224 contacts and/or comes to a close proximity of inner seal surface 286, forming a seal which substantially fluidly separates rotary machine cavities 282 and 284. In one embodiment, radial flange 224 complements seal tooth 272 of seal segment 210, thereby, preventing circumferential leakage between radial flange 224 and seal tooth 272. In one embodiment, tip 225 of radial flange 224 may be tapered and extend radially inward beyond seal tooth 272. In one embodiment, tapered tip 225 contacts inner seal surface 286, thereby substantially sealing against axial leakage. In another embodiment, tapered tip 225 may be configured to complement inner seal surface 286 so as to form a labyrinth seal. In another embodiment, radial flange 224 may mate with a partial seal tooth 272. In one embodiment, butt gap seal element 220 comprises a thin (about 0.01 inches to 0.10 inches of thick) metallic plate which is compliant under pressure loading. In one embodiment, a pressure gradient 22 between rotary machine cavities 282 and 284 may substantially affix and/or cause butt gap seal 220 to hold a seal with axial neck 212. In another embodiment, butt gap seal element 220 may be affixed (e.g., welded, press fit, etc.) to seal segment 210. In another embodiment, butt gap seal element 220 may be formed as a bellows to allow relative motion, thereby substantially physically dividing the segment butt gap into two regions: head flange 214 butt gap portion and axial neck 212 butt gap portion.

Figure 3:
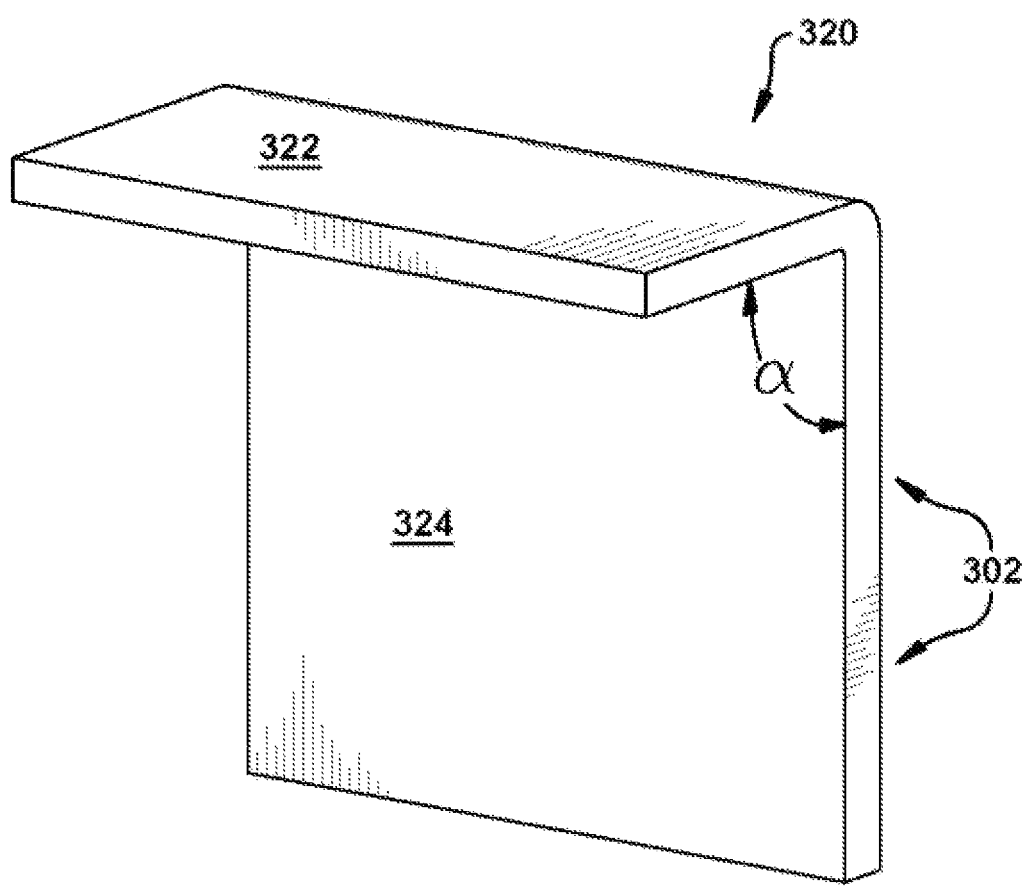
FIG. 3 shows a three-dimensional perspective view of portions of a butt gap seal element in accordance with an aspect of the invention.

Turning to FIG. 3, a three-dimensional perspective view of portions of a butt gap seal element 320 is shown according to embodiments. In this embodiment, an axial flange 322 is oriented at an angle α relative to a radial flange 324. In one embodiment, angle α may be approximately ninety degrees. In another embodiment, angle α may orient a surface 302 of radial flange 324 substantially perpendicular to pressure gradient 22 which forces radial flange 324 against axial neck 212 (shown in FIG. 2). It is understood that butt gap seal element 320 may include any number of axial flanges 322 and/or radial flanges 324. Further, the angle α of axial flange 322 relative to radial flange 324 may be any angle suitable to limit fluid leakage through seal assembly 100, preferably ranging from about 60 degrees to about 180 degrees.

Figure 4:
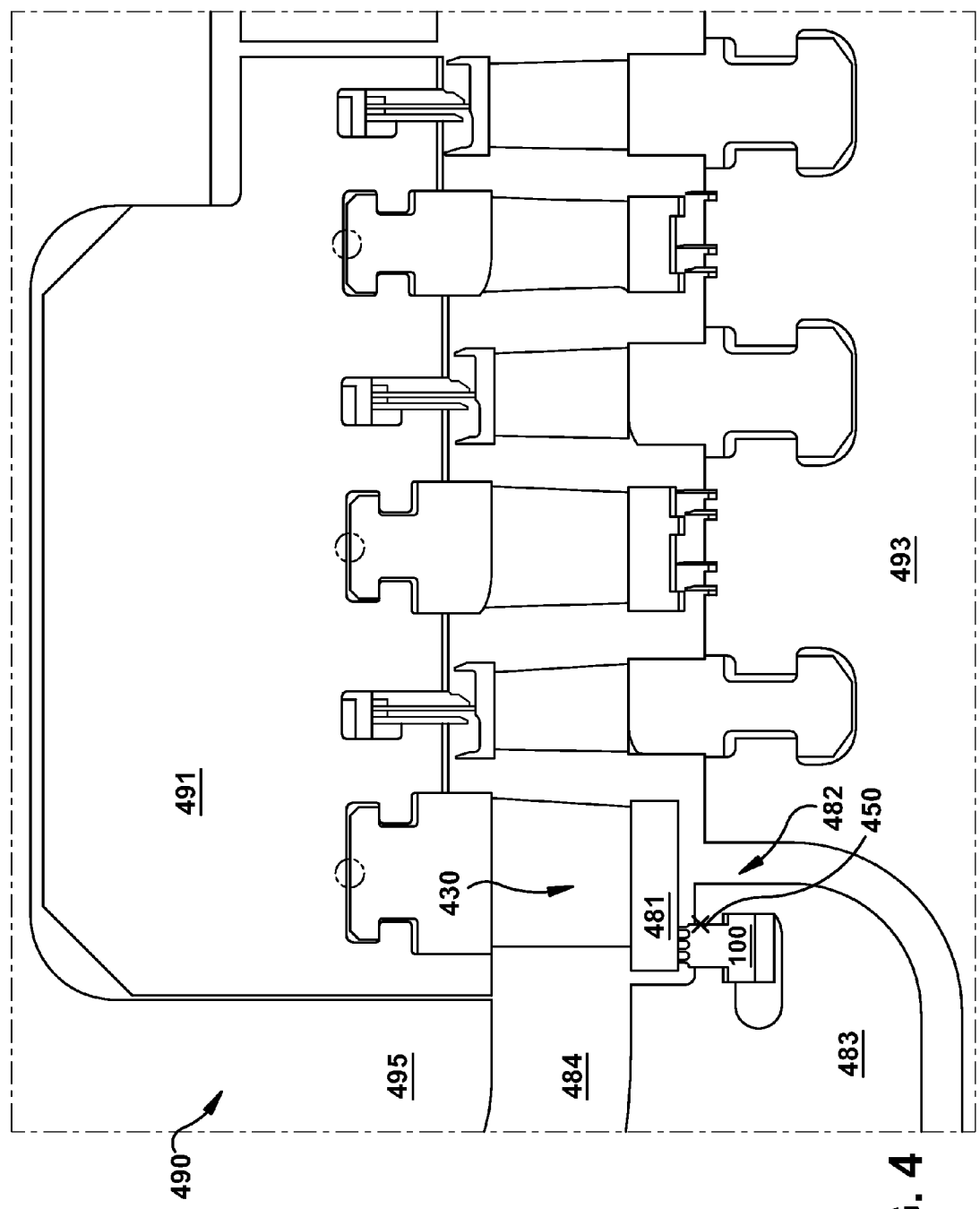
FIG. 4 shows a partial cut-away schematic view of a turbine in accordance with an aspect of the invention.

Turning to FIG. 4, a partial cut-away view of a portion of a turbine 490 is shown, having seal assembly 100 disposed between an inlet packing head 483 and a first stage nozzle 430 of turbine 490. Seal assembly 100 contacts inlet packing head 483 and a nozzle tip 481 at a steam joint 450, thereby substantially forming a seal. In this embodiment, turbine 490 includes a stator 491, a rotor 493 substantially enclosed by stator 491, and a casing 495 physically connected to stator 491. In one embodiment seal assembly 100 substantially fluidly isolates an inlet bowl 484 and an endpacking passageway 482. Seal assembly 100 prevents high-pressure fluid in inlet bowl 484 from bypassing nozzle 430 and leaking into endpacking passageway 482. It is understood that the location of seal assembly 100 in this embodiment is not limited to this exemplary embodiment as seal assembly 100 may be disposed within any stage and/or section of turbine 490 or like turbine known in the art. In one embodiment, seal assembly 100 and/or seal segments 110 may be inspringing (e.g., seal teeth 270 are oriented radially inward and seal segments 110 are spring loaded so as to force seal segments 110 radially inward) relative to turbine 490. In another embodiment, seal assembly 100 and/or seal segments 110 may be outspringing (e.g., seal teeth 270 are oriented radially outward and seal segments 110 are spring loaded to force seal segments 110 radially outward) relative to turbine 490.

Figure 5:
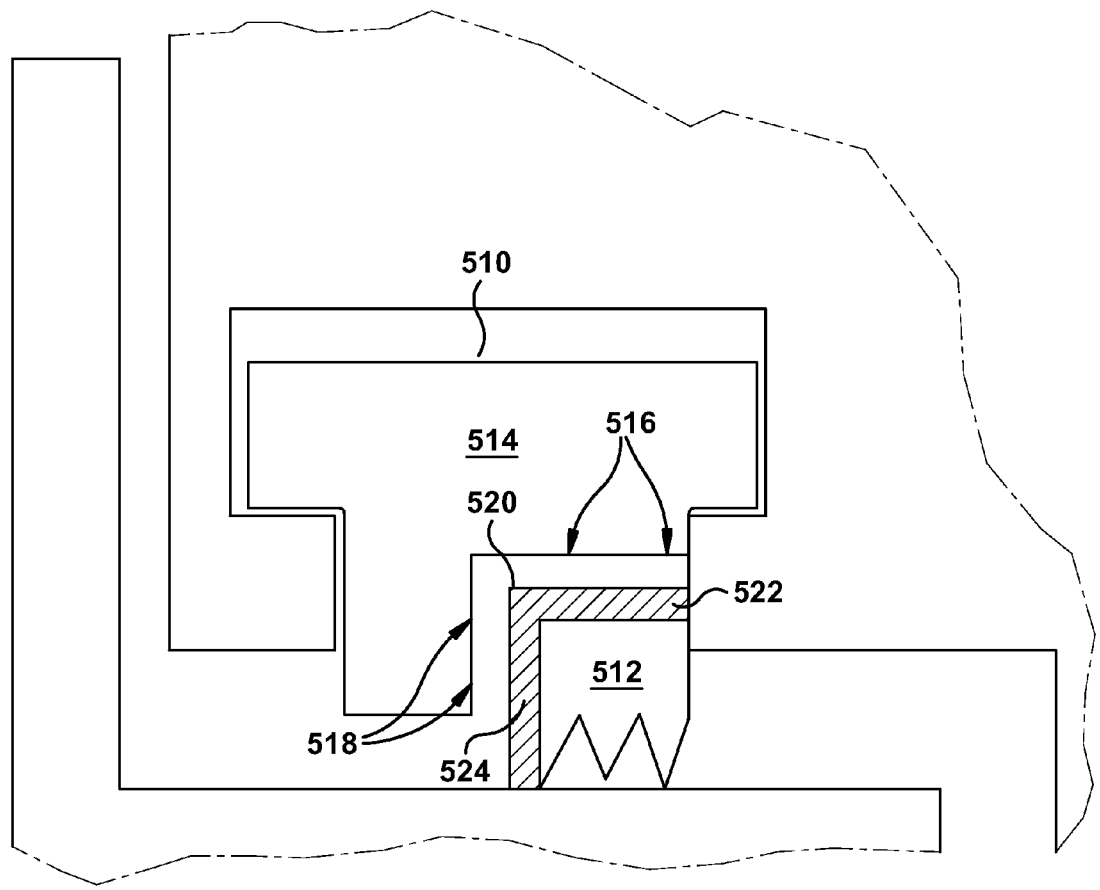
FIG. 5 shows a schematic cut-away view of portions of a seal segment in accordance with an aspect of the invention.
Figure 6:
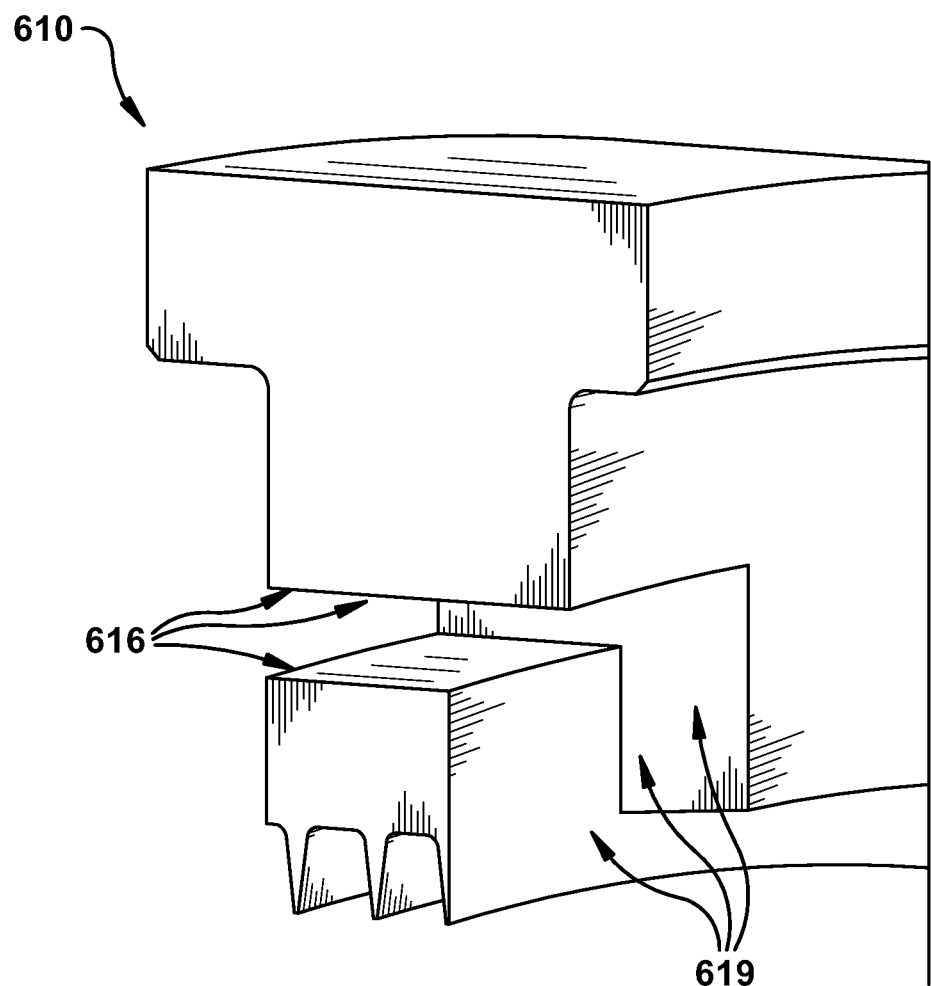
FIG. 6 shows a three-dimensional perspective view of portions of a seal segment in accordance with an aspect of the invention.
Figure 7:
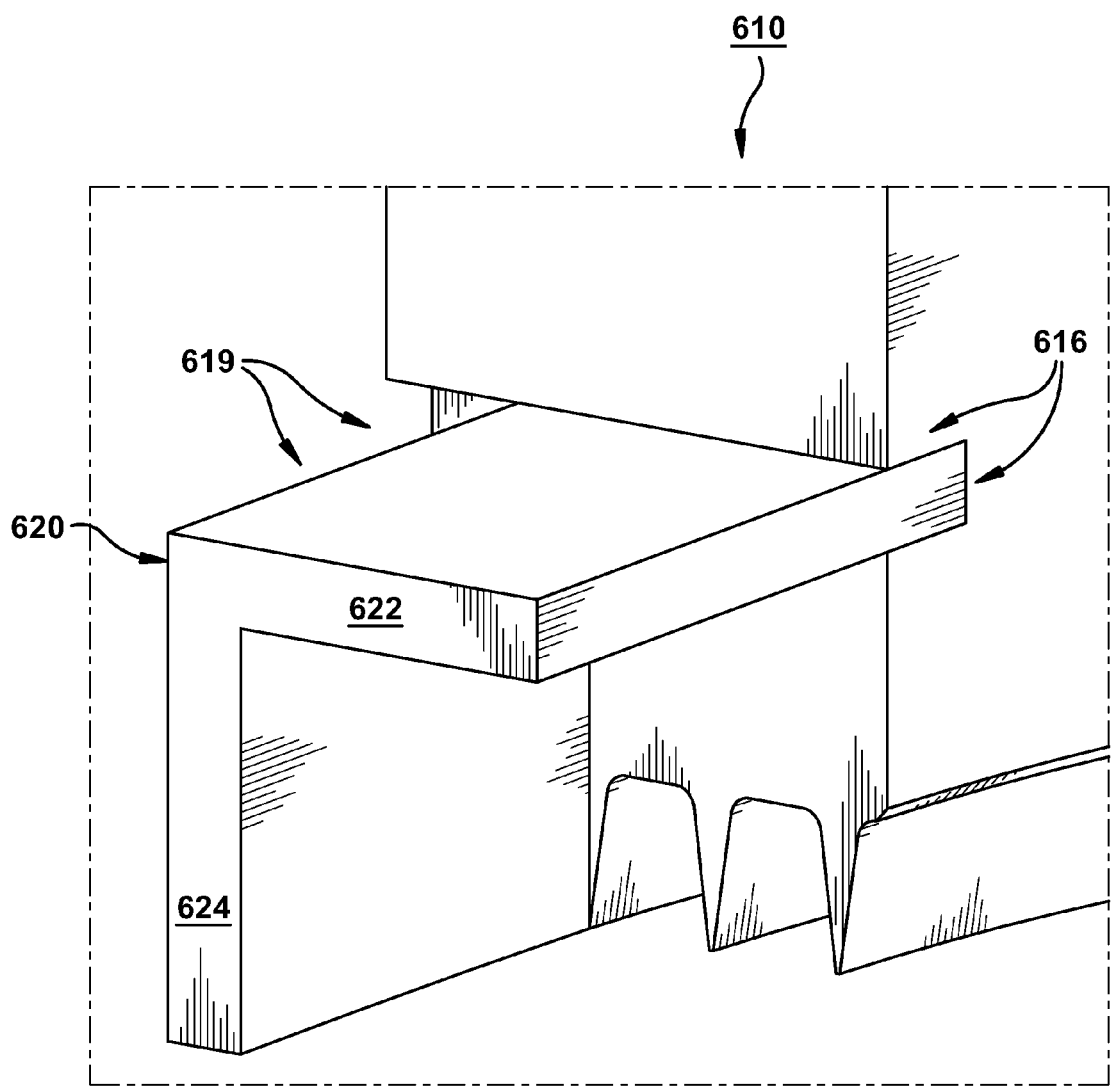
FIG. 7 shows a three-dimensional perspective view of portions of a seal segment in accordance with an aspect of the invention.

Turning to FIG. 5, a schematic cut-away view of portions of a seal segment 510 is shown according to embodiments. In this embodiment, seal segment 510 includes a head flange 514 and an axial neck 512 which may include an axial slot 516 and a radial slot 518. Axial slot 516 configured to receive an axial flange 522 of a complementary butt gap seal element 520, and radial slot 518 configured to receive a radial flange 524 of complementary butt gap seal element 520. In one embodiment, butt gap seal element 520 may be installed substantially within axial neck 512. Turning to FIG. 6, a three-dimensional perspective view of portions of a seal segment 610 is shown according to embodiments. In this embodiment, seal segment 610 includes an axial slot 616 and a radial notch 619 configured to complement a butt gap seal element 620, such that, as can be seen in FIG. 7, butt gap seal element 620 may be installed within seal segment 610. In this embodiment, an axial flange 622 of butt gap seal element 620 may be installed within axial slot 616 and a radial flange 624 may be installed within radial notch 619.

Figure 8:
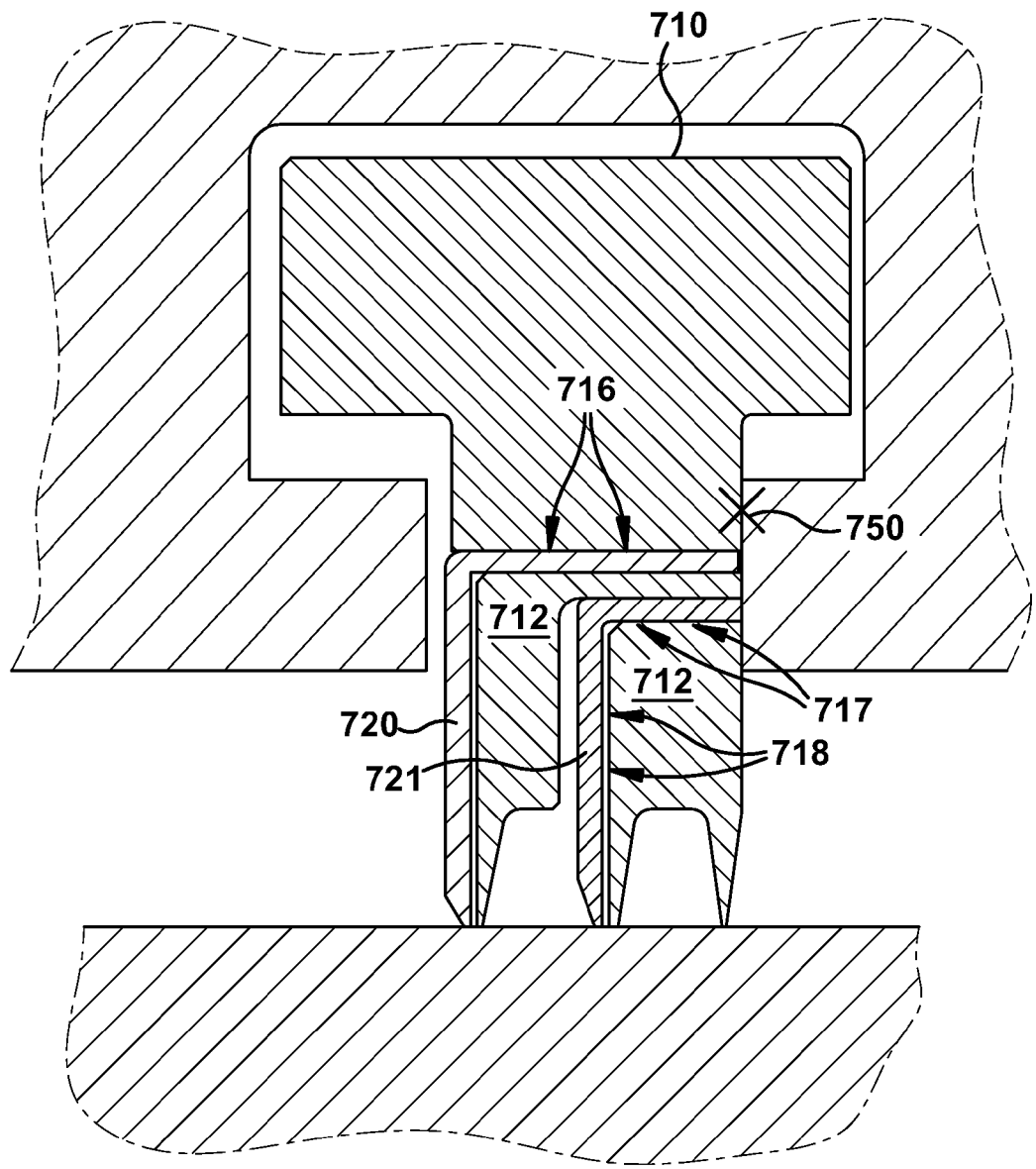
FIG. 8 shows a schematic cut-away view of portions of a seal segment in accordance with an aspect of the invention.

Turning to FIG. 8, a schematic cut-away view of portions of a seal segment 710 is shown according to embodiments. In this embodiment, seal segment 710 includes an axial neck 712, which defines a first axial slot 716, a second axial slot 717 and a radial slot 718. In this embodiment, a first butt gap seal element 720 may be disposed within first axial slot 716 and a second butt gap seal element 721 may be disposed within radial slot 718 and second axial slot 717. In one embodiment, first axial slot 716 and second axial slot 717 may be located radially inboard of a steam joint 750.

Figure 9:
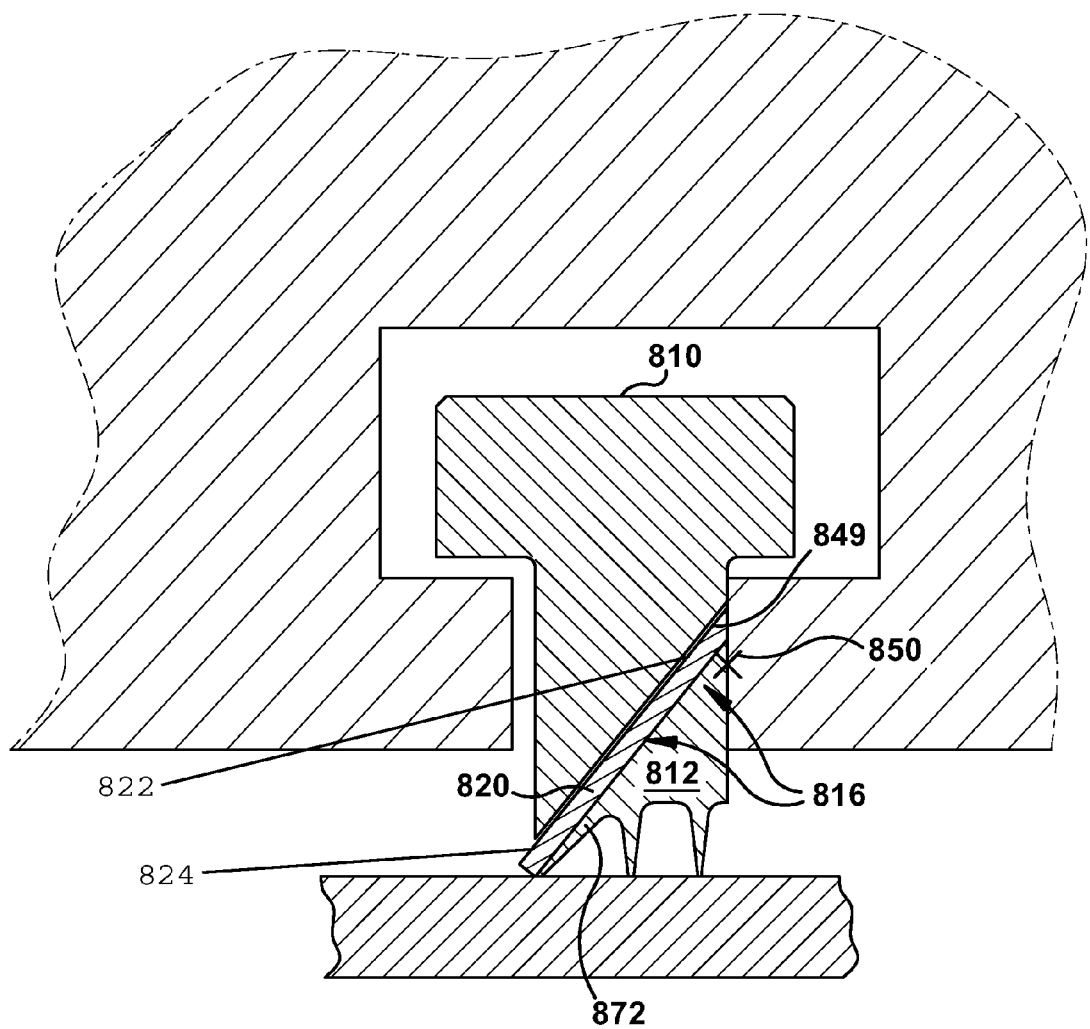
FIG. 9 shows a schematic cut-away view of portions of a seal segment in accordance with an aspect of the invention.

Turning to FIG. 9, a schematic cut-away view of portions of a seal segment 810 is shown according to embodiments. In this embodiment, seal segment 810 includes an axial neck 812 which defines a radially angled slot 816 configured to receive a butt gap seal element 820. In one embodiment, butt gap seal element 820 may be substantially planar in shape, with an axial flange 822 positioned at an angle of about 180 degrees relative to a radial flange 824. It is understood that axial flange 822 may be positioned at any angle relative to radial flange 824. In another embodiment, butt gap seal element 820 may be substantially curved in shape. In any event, in this embodiment, butt gap seal element 820 is disposed within radially angled slot 816. In one embodiment, a distal end 849 of butt gap seal element 820 physically contacts a steam joint surface 850. In another embodiment, distal end 849 is configured substantially proximate to steam joint surface 850. In one embodiment, a front axial seal tooth 872 of seal segment 810 may be radially angled so as to complement butt gap seal element 820.

Figure 10:
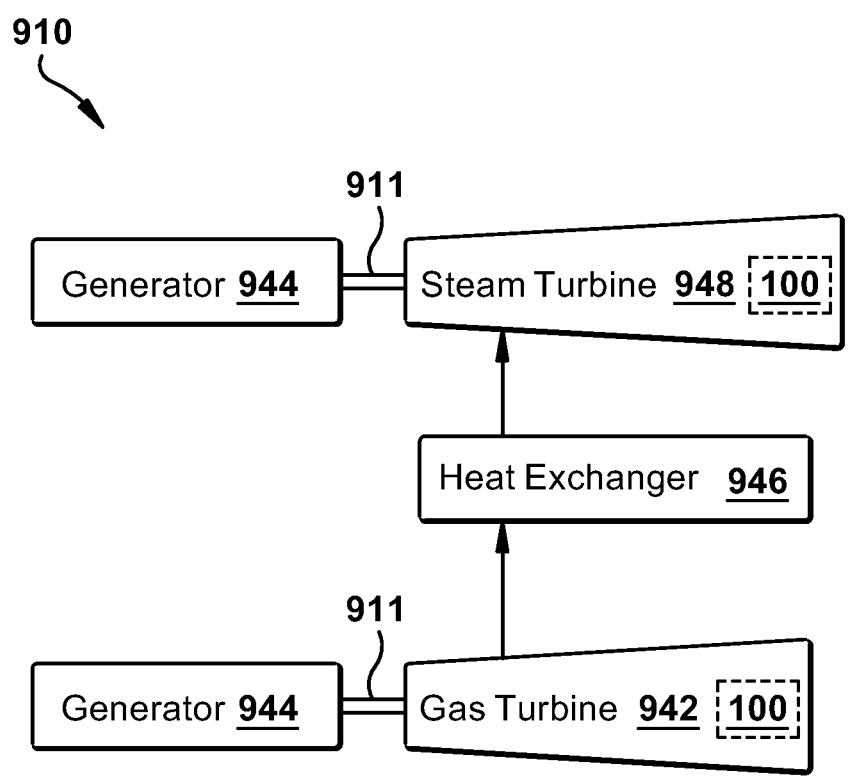
FIG. 10 shows a schematic view of portions of a multi-shaft combined cycle power plant in accordance with an aspect of the invention.
Figure 11:
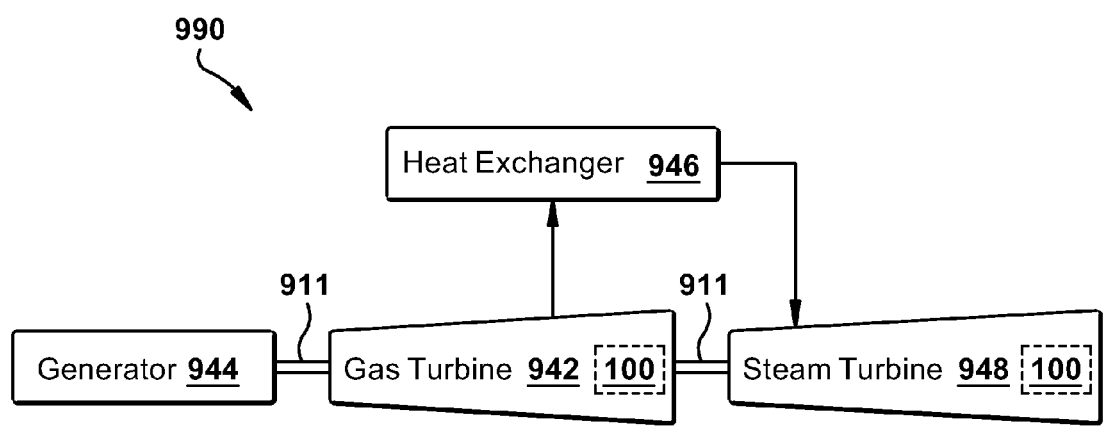
FIG. 11 shows a schematic view of a single shaft combined cycle power plant in accordance with an aspect of the invention.

Turning to FIG. 10, a schematic view of portions of a multi-shaft combined cycle power plant 910 is shown. Combined cycle power plant 910 may include, for example, a gas turbine 942 operably connected to a generator 944. Generator 944 and gas turbine 942 may be mechanically coupled by a shaft 911, which may transfer energy between a drive shaft (not shown) of gas turbine 942 and generator 944. Also shown in FIG. 10 is a heat exchanger 946 operably connected to gas turbine 942 and a steam turbine 948. Steam turbine 948 and/or gas turbine 942 may include seal assembly system 100 of FIG. 1 or other embodiments described herein. Heat exchanger 946 may be fluidly connected to both gas turbine 942 and a steam turbine 948 via conventional conduits (numbering omitted). Heat exchanger 946 may be a conventional heat recovery steam generator (HRSG), such as those used in conventional combined cycle power systems. As is known in the art of power generation, HRSG 946 may use hot exhaust from gas turbine 942, combined with a water supply, to create steam which is fed to steam turbine 948. Steam turbine 948 may optionally be coupled to a second generator system 944 (via a second shaft 911). It is understood that generators 944 and shafts 911 may be of any size or type known in the art and may differ depending upon their application or the system to which they are connected. Common numbering of the generators and shafts is for clarity and does not necessarily suggest these generators or shafts are identical. Generator system 944 and second shaft 911 may operate substantially similarly to generator system 944 and shaft 911 described above. In another embodiment, shown in FIG. 11, a single shaft combined cycle power plant 990 may include a single generator 944 coupled to both gas turbine 942 and steam turbine 946 via a single shaft 911. Steam turbine 946 and/or gas turbine 942 may include seal assembly 100 of FIG. 1 or other embodiments described herein.

The seal assemblies, seal segments and butt gap seal elements of the present disclosure is not limited to any one particular turbine (e.g., low pressure, intermediate pressure, high pressure, steam, gas, etc.), power generation system or other system, and may be used with other power generation systems and/or systems (e.g., combined cycle, simple cycle, nuclear reactor, etc.). Additionally, the seal assemblies, seal segments and butt gap seal elements of the present invention may be used with other systems not described herein that may benefit from the separation and protection of the seal assembly and butt gap seal element described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power generation system comprising:
   a generator; and
   a turbine operably connected to the generator, the turbine including;
   a rotor;
   a stator substantially enclosing the rotor; and
   a seal assembly disposed within the stator and configured to substantially fluidly isolate portions of the turbine, the seal assembly including:
   a complementary set of seal segments configured relative one another so as to form a substantially continuous body with butt gaps between seal segments, the seal segments including:
   a head flange; and
   an axial neck connected to the head flange, wherein the axial neck extends radially inboard and includes an axial slot formed substantially therethrough; and
   at least one butt gap seal element, wherein the at least one butt gap seal element includes an axial flange and a radial flange, the axial flange disposed within the axial slots of adjacent seal segments; and the radial flange extending radially inboard from the axial slots to a proximity of the rotary machine substantially forming a barrier to axial flow through the butt gap, the axial slots being configured to dispose a distal end of the axial flange directly proximate to a steam joint of the rotary machine.

2. The power generation system of claim 1, wherein each axial slot is configured to dispose the distal end of the axial flange radially inboard the steam joint of the rotary machine.

3. The power generation system of claim 1, wherein the radial flange is configured to contact a surface of the rotary machine.

4. The power generation system of claim 1, wherein the radial flange is further configured to complement a partial axial seal tooth disposed upon the axial neck.

5. The power generation system of claim 1, wherein the axial flange is positioned at an angle of about 90 degrees relative to the radial flange.

6. A turbine comprising:
   a rotor;
   a stator substantially enclosing the rotor; and
   a seal assembly disposed within the stator and configured to substantially fluidly isolate portions of the turbine, the seal assembly including:
   a complementary set of seal segments configured relative one another so as to form a substantially continuous body with butt gaps between seal segments, the seal segments including:
   a head flange; and
   an axial neck connected to the head flange, wherein the axial neck extends radially inboard and includes an axial slot formed substantially therethrough; and
   at least one butt gap seal element, wherein the at least one butt gap seal element includes an axial flange and a radial flange, the axial flange disposed within the axial slots of adjacent seal segments; and the radial flange extending radially inboard from the axial slots to a proximity of the rotary machine substantially forming a barrier to axial flow through the butt gap, the axial slots being configured to dispose a distal end of the axial flange directly proximate to a steam joint of the rotary machine.

7. The turbine of claim 6, wherein the radial flange is configured to contact a surface of the rotary machine.

8. The turbine of claim 6, wherein the radial flange is further configured to complement a partial axial seal tooth disposed upon the axial neck.

9. The turbine of claim 6, wherein the axial flange is positioned at an angle of about 90 degrees relative to the radial flange.

10. The turbine of claim 6, wherein the axial neck further includes an axial length, and the axial slot formed therethrough extends across the axial length of the axial neck.

11. The turbine of claim 6, wherein the axial neck further includes an axial length, the axial slot formed therethrough extends across the axial length of the axial neck, and the axial flange is configured to contact the steam joint of the rotary machine.

12. A seal assembly for a rotary machine, the seal assembly comprising:
   a complementary set of seal segments configured relative one another so as to form a substantially continuous body with butt gaps between the seal segments, the seal segments including:
   a head flange; and
   an axial neck connected to the head flange, wherein the axial neck extends radially inboard and includes an axial slot formed substantially therethrough; and
   at least one butt gap seal element, wherein the at least one butt gap seal element includes an axial flange and a radial flange, the axial flange disposed within the axial slots of adjacent seal segments; and the radial flange extending radially inboard from the axial slots to a proximity of the rotary machine substantially forming a barrier to axial flow through the butt gap, the axial slots being configured to dispose a distal end of the axial flange directly proximate to a steam joint of the rotary machine.

13. The seal assembly of claim 12, wherein each axial slot is configured to dispose the distal end of the axial flange radially inboard the steam joint of the rotary machine.

14. The seal assembly of claim 12, wherein the radial flange is configured to contact a surface of the rotary machine.

15. The seal assembly of claim 12, further comprising a plurality of seal teeth connected to the axial neck.

16. The seal assembly of claim 15, wherein the radial flange is further configured to complement a partial axial seal tooth disposed upon the axial neck.

17. The seal assembly of claim 12, wherein the axial flange is positioned at an angle of about 90 degrees relative to the radial flange.

18. The seal assembly of claim 12, wherein a distal end of the radial flange is tapered to complement a surface of the rotary machine and a pressure gradient across at least one axial neck presses the radial flange against the at least one axial neck.

19. The seal assembly of claim 12, wherein the axial flange and the radial flange are substantially perpendicular.

20. The seal assembly of claim 12, wherein the axial neck further includes an axial length, and the axial slot formed therethrough extends across the axial length of the axial neck.

* * * * *